(12) United States Patent
Sakai et al.

(10) Patent No.: US 10,644,408 B2
(45) Date of Patent: May 5, 2020

(54) ANTENNA APPARATUS

(71) Applicant: DENSO CORPORATION, Kariya, Aichi-pref. (JP)

(72) Inventors: Toshiya Sakai, Nisshin (JP); Kazumasa Sakurai, Nisshin (JP); Kazushi Kawaguchi, Nisshin (JP); Yuji Sugimoto, Nisshin (JP); Asahi Kondo, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/078,890

(22) PCT Filed: Feb. 23, 2017

(86) PCT No.: PCT/JP2017/006876
§ 371 (c)(1),
(2) Date: Aug. 22, 2018

(87) PCT Pub. No.: WO2017/146163
PCT Pub. Date: Aug. 31, 2017

(65) Prior Publication Data
US 2019/0067827 A1  Feb. 28, 2019

(30) Foreign Application Priority Data
Feb. 23, 2016 (JP) .................. 2016-032213

(51) Int. Cl.
*H01Q 15/08* (2006.01)
*G01S 7/03* (2006.01)
*H01Q 1/32* (2006.01)
*G01S 13/931* (2020.01)
*H01Q 1/42* (2006.01)

(52) U.S. Cl.
CPC ............... *H01Q 15/08* (2013.01); *G01S 7/03* (2013.01); *G01S 13/931* (2013.01); *H01Q 1/3233* (2013.01); *H01Q 1/42* (2013.01)

(58) Field of Classification Search
CPC ................. H01Q 1/3233; H01Q 1/42; H01Q 15/02–15/08; H01Q 19/06; G01S 13/93
See application file for complete search history.

(56) References Cited

U.S. PATENT DOCUMENTS 6,028,560 A * 2/2000 Pfizenmaier .......... G01S 13/931
343/753
6,674,392 B1 * 1/2004 Schmidt ................ G01S 13/931
342/70

(Continued)

FOREIGN PATENT DOCUMENTS

JP   2004-312696 A   11/2004
JP   2018-017552 A   2/2018

*Primary Examiner* — Hai V Tran
*Assistant Examiner* — Hasan Z Islam
(74) *Attorney, Agent, or Firm* — Knobbe, Martens, Olson & Bear, LLP

(57) ABSTRACT

An element section includes at least one antenna element transmitting/receiving radio waves. Refracting sections refract unnecessary waves, which are radio waves emitted from the element section and traveling away from a detection area, in a rearward direction in which the unnecessary waves travel further than an antenna-formed surface having the at least one antenna element of the element section.

7 Claims, 5 Drawing Sheets

(56) References Cited

U.S. PATENT DOCUMENTS

| | | | | |
|---|---|---|---|---|
| 8,193,994 B2* | 6/2012 | Alamouti | ............... | H01O 1/007 |
| | | | | 343/753 |
| 2004/0227663 A1 | 11/2004 | Suzuki et al. | | |
| 2015/0346334 A1* | 12/2015 | Nagaishi | ................. | G01S 13/60 |
| | | | | 342/115 |
| 2016/0099498 A1* | 4/2016 | Pance | ................... | H01F 1/0551 |
| | | | | 343/787 |
| 2017/0346177 A1* | 11/2017 | Nagata | ..................... | H01Q 1/42 |
| 2018/0013196 A1* | 1/2018 | Sakurai | ..................... | G01S 7/02 |

* cited by examiner

VEHICLE COMPONENT
100

FORWARD ↕ REARWARD
Z
X

ANTENNA APPARATUS

CROSS-REFERENCE TO RELATED APPLICATIONS

This application is the U.S. national phase of International Application No. PCT/JP2017/006876, filed on Feb. 23, 2017, which designated the U.S. and claims priority to Japanese Patent Application No. 2016-032213, filed Feb. 23, 2016, the contents of which are incorporated herein by reference.

TECHNICAL FIELD

The present disclosure relates to an antenna apparatus transmitting/receiving radio waves for detecting objects.

BACKGROUND ART

An antenna apparatus for vehicle-mounted radar defines a predetermined angular region as a detection area, transmits radio waves within the detection area, and receives the waves reflected from object(s) present in the detection area. Typically, it is difficult to design an antenna that transmits radio waves only within the detection area, and some of the radio waves leak outside the detection area. The leaked radio waves, which are unnecessary waves, may be reflected from the outside of the detection area, and these reflected waves are known to deteriorate antenna characteristics in some cases. PTL 1, for example, discloses a technique for preventing this problem. The disclosed technique involves providing a radio waves absorbing layer, which minimizes leakage of radio waves outside a detection area, on side surfaces of a cover member formed of material through which radio waves can pass through, so as to protect antenna elements that transmit radio waves.

CITATION LIST

Patent Literature

PTL 1: JP 2004-312696 A

SUMMARY OF THE INVENTION

However, the inventors discovered through extensive research that providing a radio waves absorbing layer requires a material of large dielectric loss to be disposed on a cover member, which makes the manufacturing process complicated.

The present disclosure provides a technique for easily minimizing the influence of unnecessary waves leaked outside a detection area on antenna characteristics.

In one aspect of the present disclosure, an antenna apparatus includes an element section and refracting sections. The element section includes at least one antenna element that transmits/receives radio waves. The refracting section is configured such that a traveling direction of unnecessary waves is changed such that radio waves emitted outside of the detection area from the element section are refracted in a direction toward a rearward direction from an antenna-formed surface in which the antenna elements constituting the element section are formed. Here, with respect to a surface from which the element section transmits radio waves, forward is the side where the detection area is present, and rearward is the opposite direction to forward.

With this configuration, the refracting sections only need to have a function of refracting radio waves, and therefore a desired operation of the antenna apparatus is accomplished with the shape of the refracting sections. Thus, the influence of unnecessary waves leaked outside a detection area on antenna characteristics can be easily minimized without using special materials such as radio wave absorbers.

DESCRIPTION OF THE EMBODIMENTS

Embodiments of the present invention will now be described with reference to the accompanying drawings.

1. Configuration

According to the present embodiment, an antenna apparatus 1 for a vehicle-mounted radar is mounted on a vehicle, transmits radio waves of predetermined frequency (hereinafter referred to as radiation waves), and receives the waves reflected from an object that has reflected the radiation waves. This antenna apparatus 1 is disposed, for example, inside a bumper at the front of the vehicle.

Figure 1:
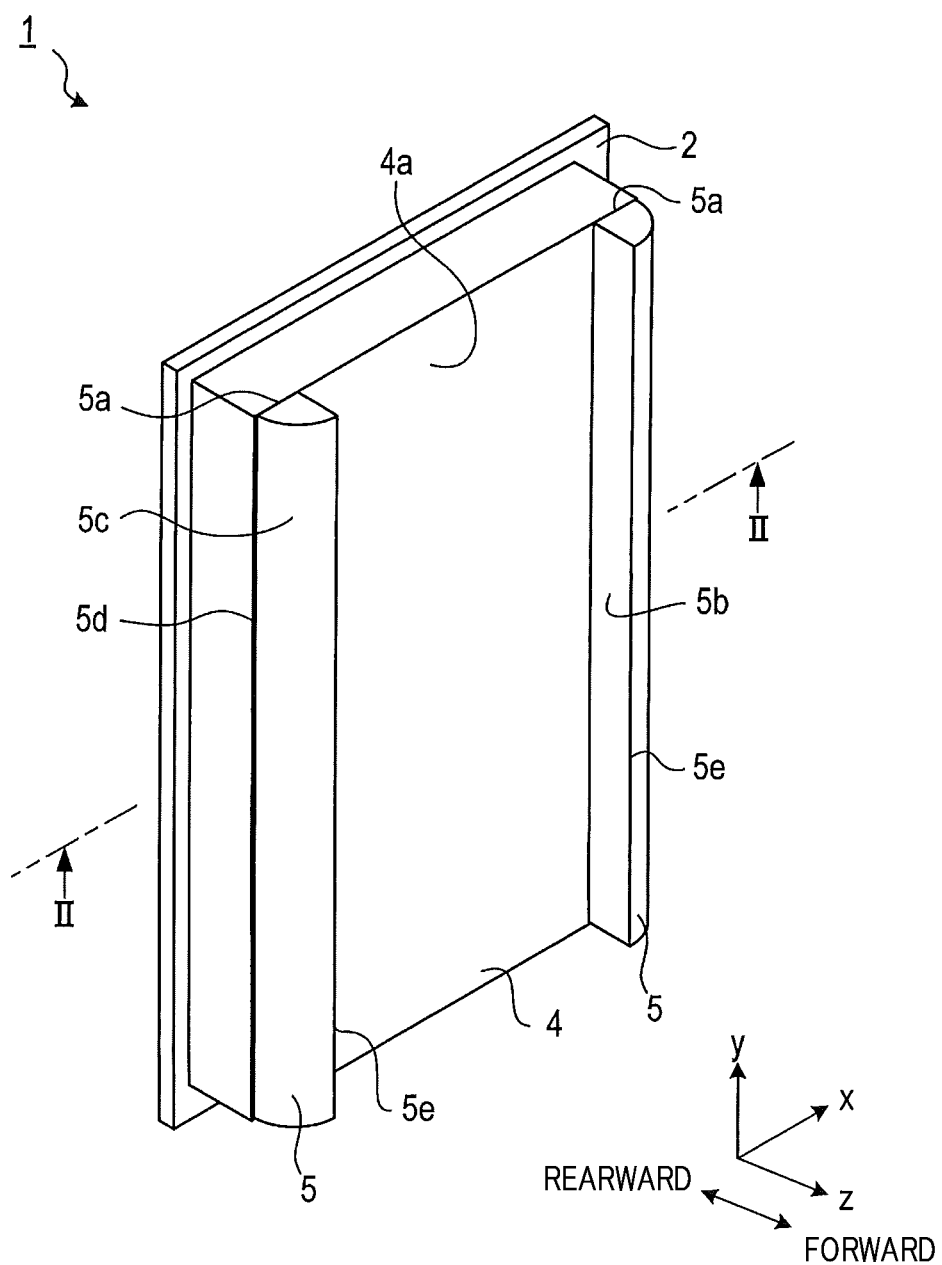
FIG. 1 is a perspective view of an antenna apparatus.
Figure 2:
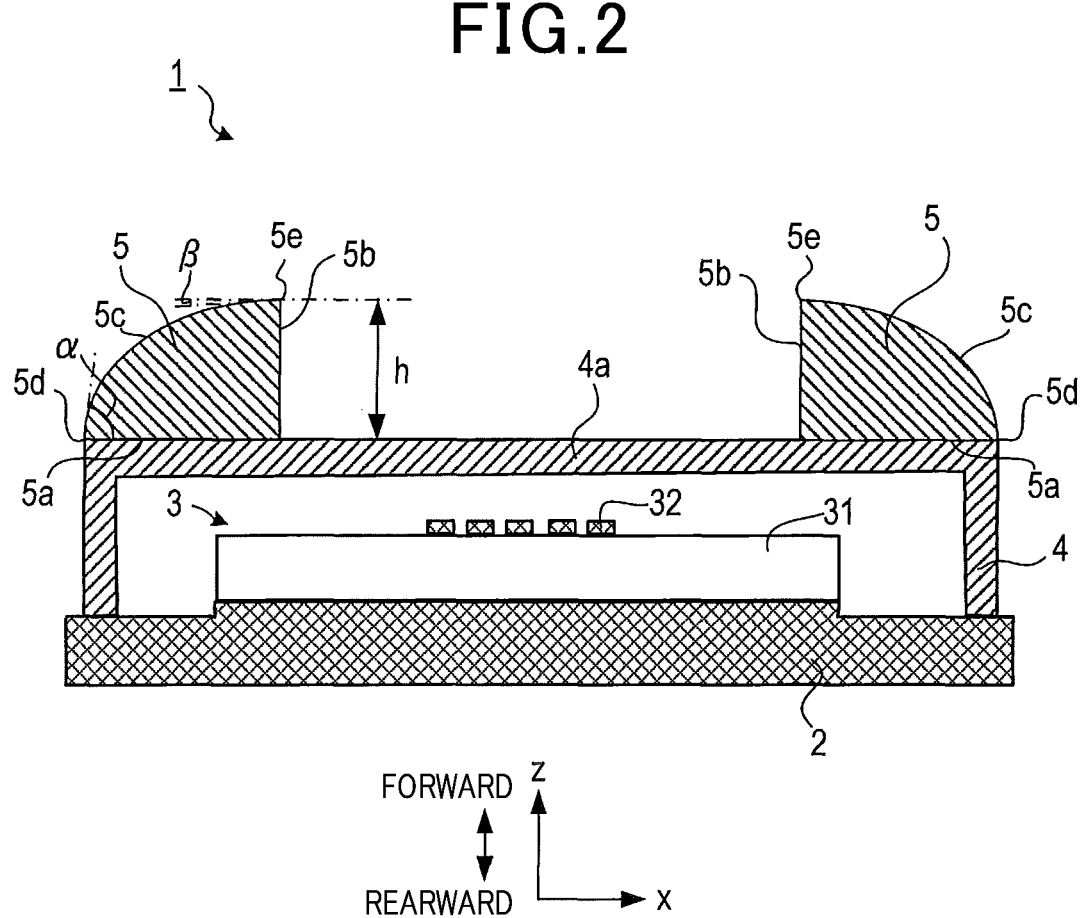
FIG. 2 is a cross-sectional view of the antenna apparatus taken along a line II-II of FIG. 1.

As illustrated in FIGS. 1 and 2, the antenna apparatus 1 includes a housing 2, an element section 3, a cover member 4, and a pair of refracting sections 5.

The housing 2 is formed of metal material and accommodates a radar that detects an object around the vehicle using the antenna apparatus 1. FIGS. 1 and 2 illustrate a part of the housing 2. The radar incorporates a signal processor and the like. The signal processor calculates information on an object that has reflected radiation waves by processing received signals acquired at a transmitter/receiver circuit that transmits radiation waves and receives the reflected waves via the element section 3. The information on the object includes at least the distance to the object.

The element section 3 includes a circuit substrate 31. The circuit substrate 31 has one surface formed with a pattern of patch antenna elements 32 transmitting/receiving radio waves. In the following description, a surface of the circuit substrate 31 where the antenna elements 32 are formed is referred to as an antenna-formed surface. A surface opposite to the antenna-formed surface is secured to the housing 2, and the housing 2 serves as a ground pattern.

The antenna elements 32 are arranged two-dimensionally in an x-axis and a y-axis directions of FIGS. 1 and 2. Each line of antenna elements 32 arranged in the y-axis direction of FIG. 1, or in a depth direction of FIG. 2, constitutes an array antenna. That is, the element section 3 has a plurality of array antennas arranged in the x-axis direction.

It should be noted that the antenna apparatus 1 is secured to the vehicle, with the y-axis direction, the x-axis direction, and a z-axis direction respectively corresponding to a vehicle height direction, a horizontal direction, and a central direction of a detection area. In the following description, a positive direction of the z-axis, or a direction in which radio waves are transmitted, is also referred to as forward, and a negative direction of the z-axis is also referred to as rearward. One of the array antennas is used as a transmitting antenna, while the remaining array antennas are used as receiving antennas. Alternatively, for example, all the array antennas may be used as transmitting antennas or receiving antennas. In addition, the number and position of array antennas for use as transmitting antennas and receiving antennas may be freely determined.

The cover member 4 is formed of dielectric though which radio waves to be transmitted/received at the element section 3 can pass with small losses. The cover member 4 has a rectangular parallelepiped shape, with one surface shaped like an open box. The cover member 4 is secured to the housing 2 with an opening closed by the housing 2, which, together with the cover member 4, defines a space for accommodating the element section 3. The cover member 4 thus protects the antenna-formed surface of the element section 3.

The refracting sections 5 have a shape cut from a circular column, forming a columnar body of fan-shaped cross-section. The refracting sections 5 are formed of dielectric having a larger dielectric dissipation factor than the cover member 4. The refracting sections 5 are disposed at both ends in the x-axis direction of an outer surface of a cover upper surface 4a along the y-axis. The cover upper surface 4a is a portion of the cover member 4 facing the element section 3. The refracting sections 5 are formed to have two rectangular flat surfaces intersecting each other. In the following description, one of the two intersecting flat surfaces of the refracting sections 5 is referred to as a lower surface 5a, while another one is referred to as a side surface 5b. Furthermore, a curved surface of the refracting section 5 is referred to as a curved surface 5c, a side where the lower surface 5a touches the curved surface 5c is referred to as a lower connecting side 5d, and a side where the side surface 5b touches the curved surface 5c is referred to as an upper connecting side 5e. The curved surface 5c is formed to have a greater degree of inclination to the antenna-formed surface of the element section 3 with increasing distance from the upper connecting side 5e.

The refracting sections 5 are positioned to have the lower connecting sides 5d in alignment with a side in the y-axis direction of the cover upper surface 4a, and the lower surfaces 5a are bonded to the cover upper surface 4a. Thus, the side surfaces 5b of the two refracting sections 5 disposed at both ends in the x-axis direction of the cover upper surface 4a are positioned to face each other.

Figure 3:
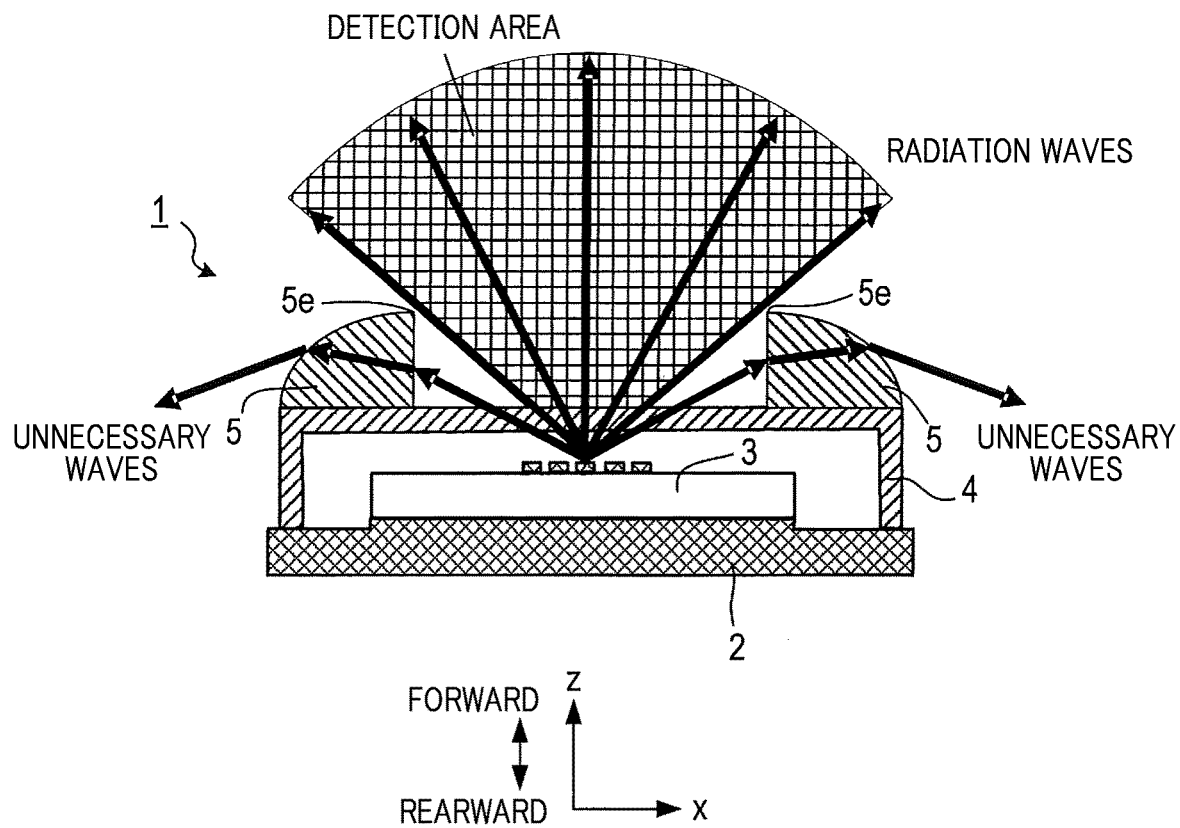
FIG. 3 illustrates the effect of refracting sections.

Further, as illustrated in FIG. 3, the refracting sections 5 have the upper connecting sides 5e in contact with the detection area. Therefore, unnecessary waves, which are waves transmitted from the element section 3 and leaked outside the detection area, will enter the side surfaces 5b of the refracting sections 5. The refracting sections 5 are designed to refract the unnecessary waves incident on the side surfaces 5b twice with the side surfaces 5b and curved surfaces 5c so as to radiate the waves in a rearward direction, or a direction toward the opposite side of a side where the detection area is present with respect to the antenna-formed surface of the element section 3.

The radius R of curvature of the curved surface 5c can be obtained from Eq. (1), and the shape of the refracting sections 5 is designed based on the result. As illustrated in FIG. 2, h is the height of the upper connecting side 5e from the cover member 4; β is the angle of inclination required for the curved surface 5c to refract in a rearward direction the unnecessary waves entering the side surface 5b and emerging from the curved surface 5c near the upper connecting side 5e; and α is the angle of inclination required for the curved surface 5c to refract in a rearward direction the unnecessary waves entering the side surface 5b and emerging from the curved surface 5c near the lower connecting side 5d. These angles of inclination α and β are defined with respect to a plane parallel to the antenna-formed surface.

$$R = h/(\cos \beta - \cos \alpha) \tag{1}$$

2. Operation

With the antenna apparatus 1 thus configured, as illustrated in FIG. 3, radio waves emitted from the element section 3 and traveling toward the detection area are transmitted without passing through the refracting sections 5, and the reflected waves from the detection area will reach the element section 3 without passing through the refracting sections 5.

On the other hand, the unnecessary waves, which are radio waves emitted from the element section 3 and traveling away from the detection area, will enter the side surfaces 5b of the refracting sections 5 and be emitted from the curved surfaces 5c in the rearward direction. That is, the unnecessary waves are emitted in a direction toward areas located a great distance away from the detection area. Radio waves traveling from a forward area and entering the curved surfaces 5c of the refracting sections 5, that is, the unnecessary waves traveling from the outside of the detection area, in particular from areas around the detection area, are refracted by the refracting sections 5 in a direction in which they will not reach the element section 3.

3. Advantageous Effects

The embodiment described in detail above can obtain the following advantageous effects.

(a) As described above, with the antenna apparatus 1, unnecessary waves traveling away from the detection area are refracted by the refracting sections 5 in a rearward direction to prevent unnecessary waves traveling from the outside of the detection area ahead from reaching the element section 3. This configuration minimizes influences of the unnecessary waves on antenna characteristics.

Figure 4:
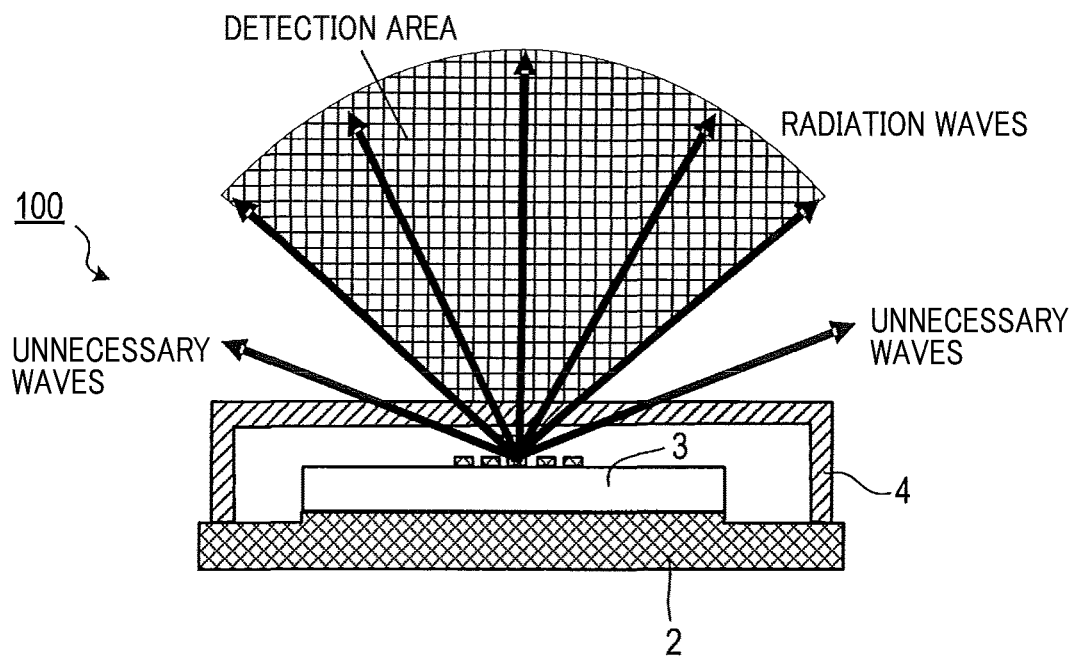
FIG. 4 illustrates a conventional antenna apparatus having no refracting sections.
Figure 5:
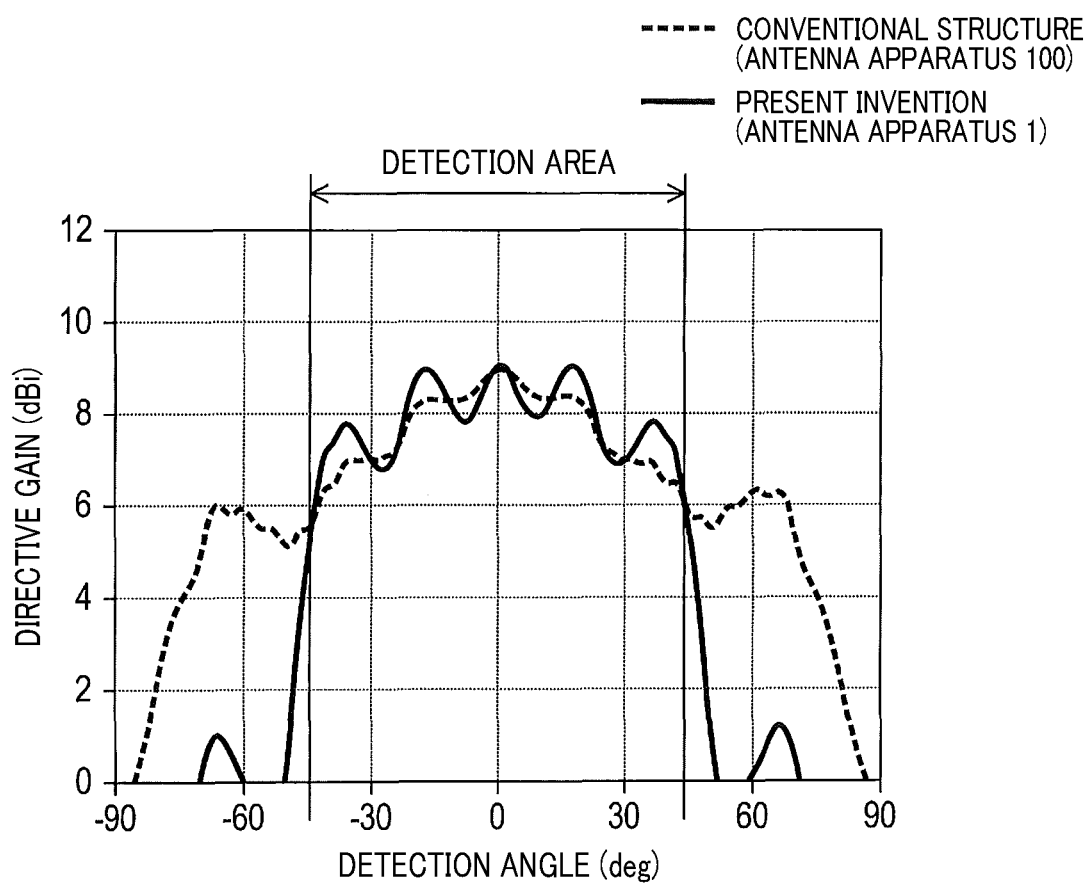
FIG. 5 is a graph showing the gain of antennas for each detection angle.

FIG. 5 shows directive gains calculated through simulation for the antenna apparatus 1 shown in FIG. 3 having the refracting sections 5 and for a conventional antenna apparatus 100 shown in FIG. 4 having no refracting sections 5. As illustrated in FIG. 5, gains of the antenna apparatus 1 outside the detection area are significantly lower than those of the conventional antenna apparatus 100.

Figure 6:
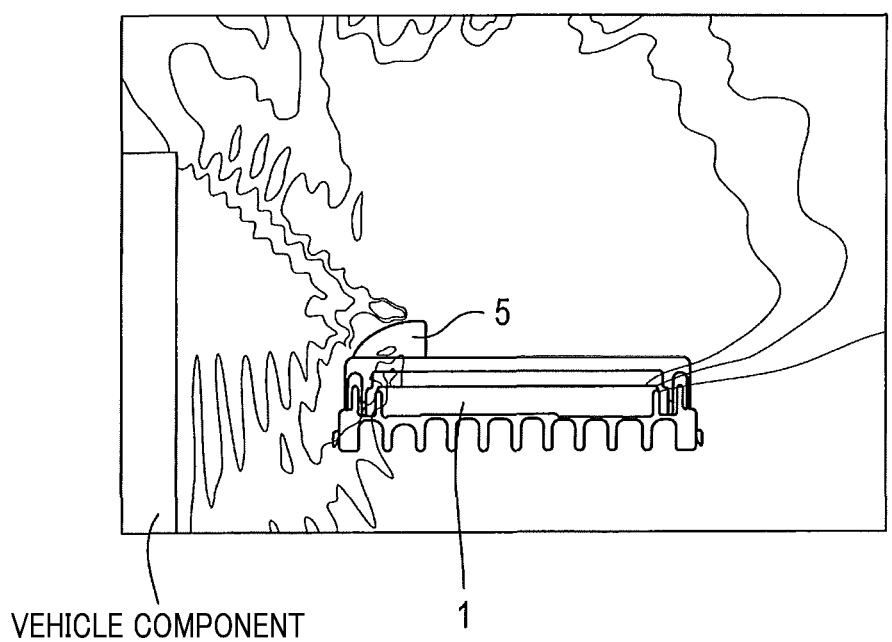
FIG. 6 is a graph showing an electric field measured for an antenna apparatus of an embodiment in an environment where a vehicle component is present outside a detection area.
Figure 7:
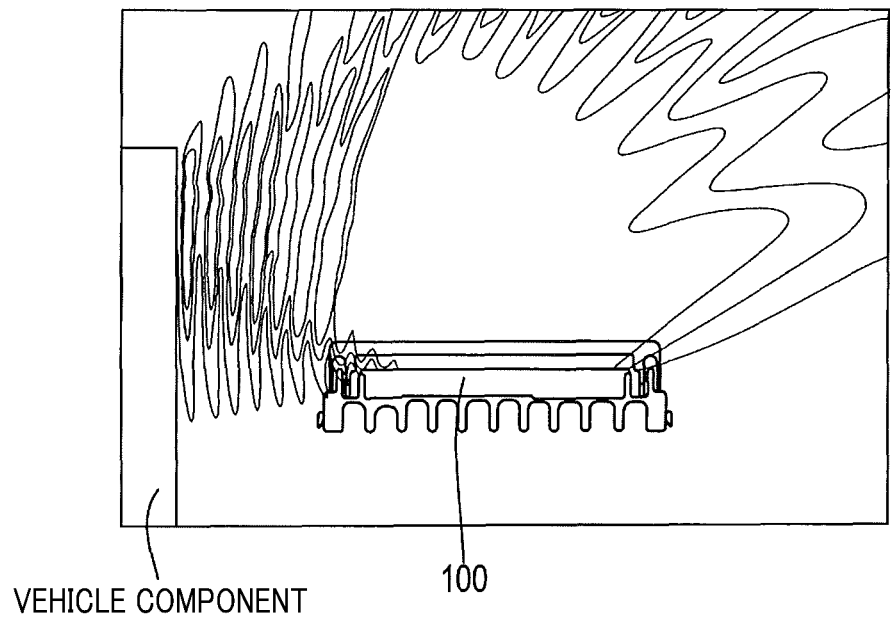
FIG. 7 is a graph showing an electric field measured for the antenna apparatus of conventional structure in the same environment as shown in FIG. 6.

FIGS. 6 and 7 show results of an electric field measured in a situation where a vehicle component that reflects radio waves is disposed on the left side of the antenna apparatus 1 and the antenna apparatus 100 of conventional structure. FIG. 6 shows an electric field for the antenna apparatus 1, while FIG. 7 shows an electric field for the conventional antenna apparatus 100. The antenna apparatus 1 has the refracting section 5 located only on a side where the vehicle component is present. As illustrated in FIGS. 6 and 7, an electric field for the antenna apparatus 1 having the refracting section 5 is less disturbed by the presence of the vehicle component than the conventional antenna apparatus 100.

(b) In the antenna apparatus 1, the refracting sections 5 are formed separately from the cover member 4, and integrated with the cover member 4 by bonding. The refracting sections 5 and cover member 4 can thus have simple shapes. Further, since the refracting sections 5 and cover member 4 are both formed of dielectric, they can be produced in the same process. This simplifies the manufacturing process.

4. Other Embodiments

Although the embodiment for carrying out the present invention has been described above, the present invention is not limited to the above-described embodiment, and various modifications can be made.

(a) Although the refracting sections 5 are formed of material having a larger dielectric dissipation factor than the cover member 4 in the above-mentioned embodiment, it is not limited thereto. For example, the refracting sections 5 and cover member 4 may be formed of the same material having the same dielectric dissipation factor.

(b) Although the refracting sections 5 and cover member 4 are integrated by bonding in the above-mentioned embodiment, it is not limited thereto. For example, the refracting sections 5 and cover member 4 may be formed integrally.

Figure 8:
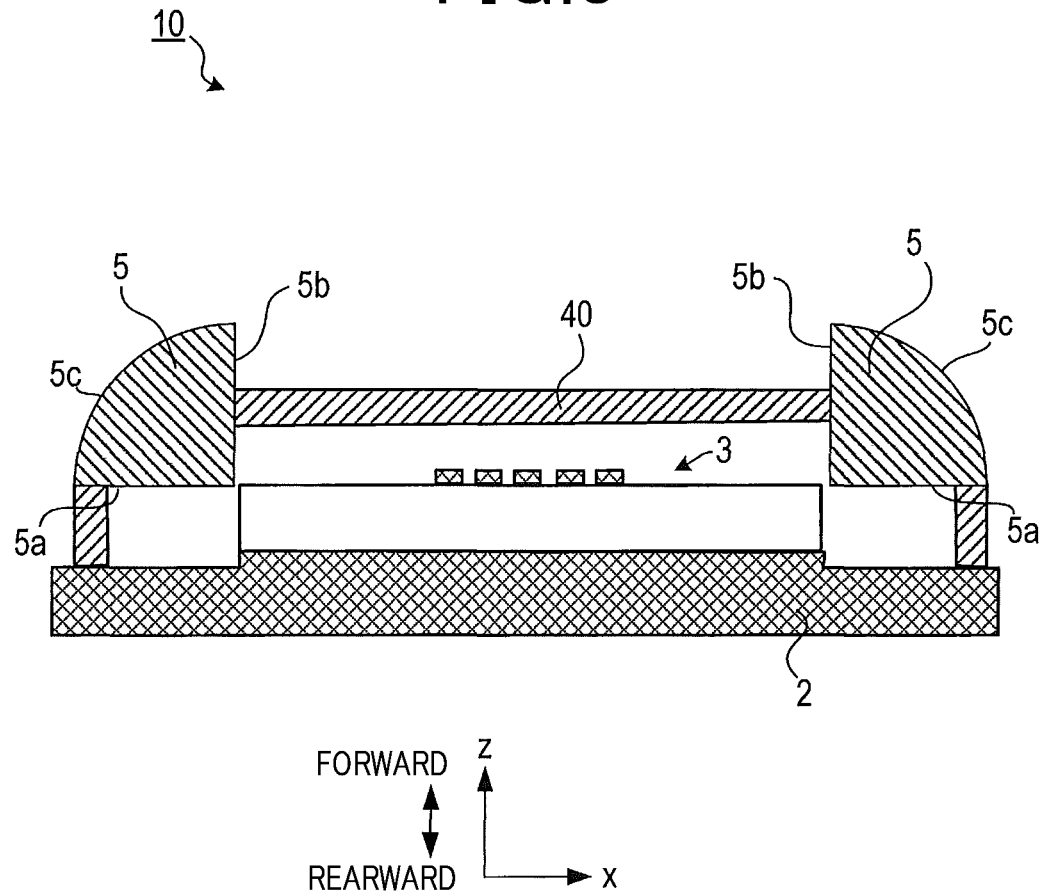
FIG. 8 illustrates in cross-section a structure of a modification of the antenna apparatus.

(c) Although the refracting sections 5 are disposed on the cover upper surface 4a in the embodiment, it is not limited thereto. For example, as with the antenna apparatus 10 of FIG. 8, the refracting sections 5 may be disposed partially inside the cover member 40 such that the lower surface 5a of the refracting sections 5 is flush with the antenna-formed surface of the element section 3. In that case, the unnecessary waves emitted from the element section 3 are prevented from entering the lower surface 5a and thereby being refracted by the refracting sections 5 in the forward direction. Consequently, the influence of the unnecessary waves on antenna characteristics is further minimized.

(d) A plurality of functions of one component according to the embodiments may be implemented by a plurality of components, or one function of one component may be implemented by a plurality of components. Additionally, a plurality of functions of a plurality of components may be implemented by one component, or one function fulfilled by a plurality of components may be implemented by one component. Furthermore, part of the configuration of the embodiments may be omitted, or at least part of the configuration of one embodiment may be added to or replaced by the configuration of another one of the embodiments. Note that the embodiments of the present disclosure include any aspects encompassed by the technical ideas specified only by the words of the claims.

(e) In addition to the antenna apparatus described above, the present disclosure can be implemented in various embodiments, such as systems having the antenna apparatus as a component and methods for removing unnecessary waves.

The invention claimed is:

1. An antenna apparatus that transmits and receives radio waves to determine at least a distance to an object present within a predetermined detection area, the antenna apparatus comprising:

an element section including at least one antenna element transmitting/receiving the radio waves; and a refracting section configured such that a traveling direction of unnecessary waves is changed such that radio waves emitted outside of the predetermined detection area from the element section are refracted in a direction toward a rearward direction from an antenna-formed surface in which the at least one antenna element constituting the element section is formed, wherein the refracting section is formed in a columnar shape having a fan-shaped cross-section, wherein one of two rectangular flat surfaces of the refracting section is a lower surface while another one is a side surface, a first side where the side surface touches a curved surface of the refracting section being an upper connecting side while a second side where the lower surface touches the curved surface is a lower connecting side, wherein the side surface is perpendicular to the antenna-formed surface and the upper connecting side is located at a boundary of the detection area, and wherein the curved surface is formed to have a greater degree of inclination to the antenna-formed surface with decreasing distance from the upper connecting side to the lower connecting side.

2. An antenna apparatus that transmits and receives radio waves to determine at least a distance to an object present within a predetermined detection area, the antenna apparatus comprising:

an element section including at least one antenna element transmitting/receiving the radio waves; and a refracting section configured such that a traveling direction of unnecessary waves is changed such that radio waves emitted outside of the predetermined detection area from the element section are refracted in a direction toward a rearward direction from an antenna-formed surface in which the at least one antenna element constituting the element section is formed, wherein the refracting section is disposed partially inside a cover member such that a lower surface of the refracting section is flush with the antenna-formed surface of the element section.

3. The antenna apparatus according to claim 2, wherein the lower surface of the refracting section is located at a position flush with the antenna-formed surface.

4. The antenna apparatus according to claim 2, wherein the refracting section is formed such that a radius of curvature of the curved surface is $h/(\cos \beta - \cos \alpha)$, where h is a length of a side perpendicular to the upper connecting side at the side surface, $\beta$ is an angle of inclination of the curved surface with respect to the antenna-formed surface at the upper connecting side, and $\alpha$ is an angle of inclination of the curved surface with respect to the antenna-formed surface at the lower connecting side.

5. The antenna apparatus according to claim 2, further comprising:

the cover member covering the element section and transmitting the radio waves, wherein the refracting section is integrated with the cover member.

6. The antenna apparatus according to claim 5, wherein the refracting section is formed of dielectric having a larger dielectric dissipation factor than the cover member.

7. The antenna apparatus according to claim 5, wherein the refracting section is formed of a same material as the cover member.

* * * * *